United States Patent [19]

Schultz et al.

[11] Patent Number: 4,885,455
[45] Date of Patent: Dec. 5, 1989

[54] PROCESS FOR TERMINATING CLOSED THROUGH-HOLE PLASMA ARC WELDING

[75] Inventors: Jean-Pierre Schultz, Meulan; Eric Verna, Cergy, both of France

[73] Assignee: l'Air Liquide, Societe Anonyme Pour l'Etude Et l'Exploitation des Procedes Georges Claude, Paris, France

[21] Appl. No.: 233,550

[22] Filed: Aug. 18, 1988

[30] Foreign Application Priority Data

Aug. 18, 1987 [FR] France .................................. 87 11669

[51] Int. Cl.$^4$ ............................................... B23K 9/00
[52] U.S. Cl. ............................ 219/121.46; 219/121.45; 219/121.54; 219/121.57; 219/121.55; 219/137 R
[58] Field of Search ................... 219/121.54, 121.55, 219/121.56, 121.57, 74, 75, 121.59, 121.58, 121.46, 137

[56] References Cited

U.S. PATENT DOCUMENTS 4,195,216  3/1980  Beauchamp et al. ........... 219/121.57

FOREIGN PATENT DOCUMENTS 0256525  2/1988  European Pat. Off. .
3405242  9/1985  Fed. Rep. of Germany .
1579377  8/1969  France .
0050975  4/1980  Japan ............................ 219/121.57
2074071  10/1981  United Kingdom .

Primary Examiner—M. H. Paschall
Attorney, Agent, or Firm—Young & Thompson

[57] ABSTRACT

To terminate welding, the mean energy of the arc is first reduced to obtain plugging of the hole, then this energy is briefly increased before again being decreased. Application to plasma arc welding of carbon steels.

7 Claims, 1 Drawing Sheet

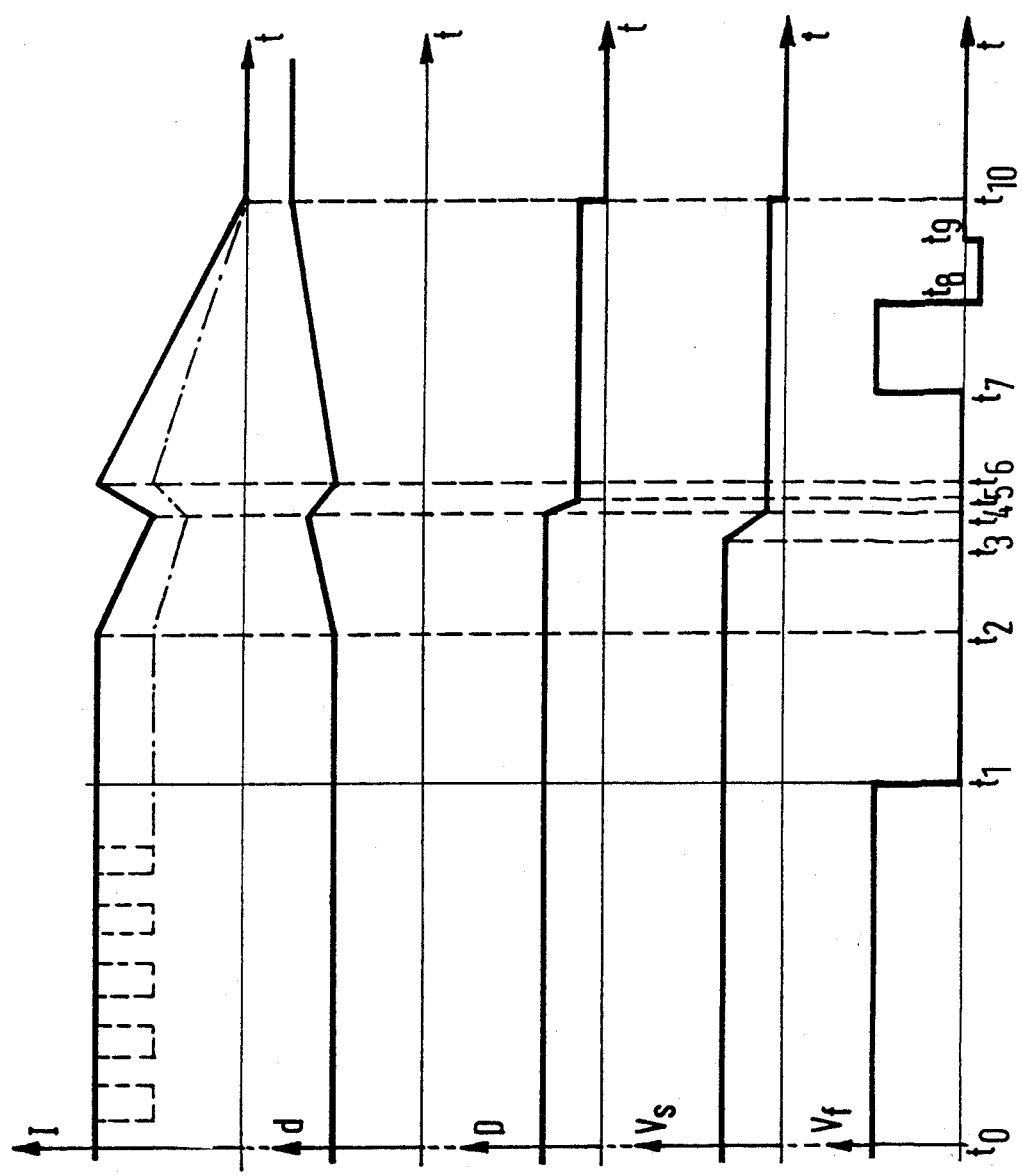

PROCESS FOR TERMINATING CLOSED THROUGH-HOLE PLASMA ARC WELDING

The present invention relates to a process for terminating closed through-hole plasma arc welding. It is particularly but not exclusively useful in the welding of carbon steel.

In plasma arc welding, the arc springs between an electrode (generally of tungsten or other refractory material) and another electrode which is generally the piece to be welded, the energy of the arc being supplied by an electrical generator.

This arc is obliged to pass through a narrow hole, of some tenths to several millimeters in diameter, pierced through a block called a nozzle. A gaseous jet called the plasmagenic gas (argon, hydrogen/argon mixture, helium/argon mixture or any other suitable gas or gaseous mixture) passes through this hole.

By this technique, the electric arc is of small diameter and substantial length: its energy is concentrated and therefore permits penetrating deeply into the joint to be welded. The energy transmitted and its concentration are related to the intensity of the electric current and to the flow rate of the plasmagenic gas. For a given flow rate, the current intensity, the arc voltage and the distance from the piece to the torch (and more precisely to the electrode) are related, the control parameter generally being the arc voltage.

To butt weld two metallic pieces by plasma arc, there is a complete penetration, that is to say a cutting of the two pieces in the plane of the joint. The current intensity and gas flow rate are controlled so as to ensure that the two pieces be just pierced, the arc leaving the underside of these pieces. This is what is called through keyhole welding.

The judicious choice of the energy parameters and of the speed of welding permit ensuring the continuity of this operation, and the melted metal, instead of being violently expelled below the pieces as in cutting, collects behind the arc and around it and thus permits the connection of the two pieces through the entire thickness in a reliable manner.

In welding in general, there exist two transitional phases at the beginning and end of the operation. In particular, with plasma arc welding, there remains at the end of the operation a crater extending through the entire thickness of the piece, a crater which must be eliminated.

For welds having a beginning or an end, the addition of subsequently removed appendages permits solving this problem. On the other hand, in the case of "closed" welds, generally circular (connecting tubes or sleeves, adding bases to sleeves, etc.), this technique cannot be used, and it is therefore necessary to provide other solutions to obtain a clean joint.

The technique conventionally used consists in decreasing, conjointly or not, with or without time lag, the current intensity and the gas flow rate. The hole fills up and the added metal progressively fills the cavity at the end of welding. During this operation, the speed of welding may also vary, as well as the quantity of added metal and the time at which its transfer is effected.

This technique is generally satisfactory for metals such as stainless steel. By contrast, the direct application of this "fade out" principle to carbon steels does not permit ensuring fault-free bead ends: the presence of "blow holes" is frequently encountered, which is to say the inclusion of bubbles, in the region of the fade out, which prevents using the process industrially.

The invention has for its object to permit obtaining clean closed welds in a reliable manner on carbon steels.

To this end, the process according to the invention is characterized in that it begins by reducing the mean energy of the arc until the filling of the hole is attained, then briefly increasing this energy before again decreasing it.

According to preferred characteristics of the process:
just before or at the beginning of the period of increase of the mean energy of the arc, the plasmagenic gas flow rate is reduced; in this case, preferably, the increase of mean energy of the arc lasts longer, and preferably at least twice as long, as said reduction of flow rate;
during the first period of reduction of mean energy of the arc, the speed of advance of welding is reduced;
after the period of increase of mean energy of the arc and during the time the mean energy of the arc is again decreased, the welding torch is moved away from the piece;
as the mean energy of the arc is again decreased, addition metal is added to the welding zone.

An example of operation of the invention will now be given with regard to the accompanying drawing, in which the single figure is a diagram illustrating the changes in the various welding parameters.

On the drawing, there is given on the abscissa a single scale of time t, and, on the ordinate, five welding parameters: the intensity I of the electric current; the distance d between the electrode of the welding torch and the piece to be welded; the flow rate D of the plasmagenic gas; the speed $V_s$ of welding advance; and the speed $V_f$ of advance of the wire of addition metal.

The apparatus used is an automatic welding apparatus adapted to weld circular joints between two pieces of carbon steel. It comprises conventional automation, and a microprocessor which permits varying as desired the parameters D, $V_s$ and $V_f$, as well as the reference arc voltage on which are directly dependent the intensity I and the distance d.

The illustrated diagram begins at an arbitrary time $t_0$ at which the steady state welding condition prevails. Let is be supposed that welding is effected with direct current, as indicated in full line. At the time $t_1$, the weld bead is closed (for example following a 360° rotation of a circular joint), and the transition zone at the beginning of the bead begins to be overlapped, but without supplemental addition metal ($V_f = 0$).

After sufficient overlapping, at time t2, the withdrawal phase of the arc begins, so as to fill up the keyhole:
(1) from $t_2$ to $t_4$, the current intensity I is progressively reduced while increasing the distance d. The arc energy therefore decreases progressively, which results in plugging the bottom of the keyhole. At this time, that is at the end of this period, the speed of advance $V_s$ is reduced (from $t_3$ to $t_4$);
(2) as soon as this plugging is achieved, the current intensity I is increased simultaneously with a reduction of the distance d (if desired corrected by a variation of the nominal reference voltage to avoid too great a reduction of this distance), and a reduction of the gas flow rate D. These two variations begin at time $t_4$, and that of the current intensity I lasts longer, and preferably at least twice as long (from $t_4$ to $t_6$) as that of the gaseous flow rate (from $t_4$ to $T_5$).

However, the increase of the current intensity I is itself very short, of the order of 0.5 to 1 second.

Thus, the arc energy is increased, and the gaseous pressure on the joint is relieved, not only in the axial direction but also in the radial direction. This has the result of maintaining a substantial volume of metal in molten condition, which is transferred into the upper part of the thickness of the piece.

(3) from $t_6$ to $t_{10}$, the current intensity I is reduced to decrease the volume of the bath, and the distance d is increased. As a result, the anodic spot widens, which has the effect of enlarging the crater and shortening the arc penetration and, finally, permitting the molten metal progressively to fill the crater without abrupt precipitation.

During a portion of this period (from $t_7 > t_6$ to $t_8 < t_{10}$), there is added the quantity of addition metal necessary to fill completely the crater, which completes the withdrawal process. The time $t_7$ may for example correspond to the time at which I returns to its minimum value at $t_4$. There is indicated from $t_8$ to $t_9 < t_{10}$ a slight withdrawal of the addition wire, as is conventional in the art.

Finally, at $t_{10}$, the electric current and the gas flow rate are discontinued and the torch becomes stationary; the welding operation is completed.

Excellent results have been obtained, which is to say clean closed beads free from blow holes, with the practice of the sequence of operations described above, on carbon steels. However, the invention is equally applicable to the welding of other weldable metals by plasma arc, for example stainless steels.

By way of numerical example, the following time intervals can be selected: $t_2$ to $t_4 = 2s$, $t_4$ to $t_6 = 0.5$ to 1s, $t_4$ to $t_7 = 2s$, $t_7$ to $t_{10} = 3s$, these time periods being only of the order of magnitude, so as to make clear that, as a modification, these times at which the various parameters begin or end their variations may somewhat overlap each other, compared to what is shown in the drawing, while maintaining the phases described above. For example, the reduction of $V_s$ may begin at $t_2$, and/or, by changing the reference arc voltage, d can increase to $t_4$ to promote the widening of the crater.

Moreover, as indicated by broken line on the drawing, the invention is applicable to AC welding. In this case, the AC can continue during all the described operations, the current intensity I thus developing between the full line curve and the broken line curve, and the mean energy of the arc varying as described above.

What is claimed is:

1. In a process for terminating through-hole plasma arc closed welding during which a plasmagenic gas passes through said hole, the improvement wherein the mean arc energy is continuously decreased until the hole is plugged, then said mean arc energy is increased while the plasmagenic flow rate is decreased before said mean arc energy is again continuously decreased to zero.

2. Process according to claim 1, characterized in that the increase of the mean energy of the arc continues longer than said reduction of flow rate.

3. Process according to claim 1, characterized in that during the first period of reduction of mean energy of the arc, the speed of advance of welding is reduced.

4. Process according to claim 1, characterized in that, after the period of mean energy increase of the arc, and during the time the mean energy of the arc is again decreased, the welding torch is moved away from the piece.

5. Process according to claim 1, characterized in that, during the time the mean energy of the arc is again decreased, addition metal is added to the weld zone.

6. Process according to claim 1, characterized in that at the beginning of the period of increase of the mean energy of the arc, the flow rate of plasmagenic gas is decreased.

7. Process according to claim 1, characterized in that the increase of the mean energy of the arc continues at least twice as long as said reduction of flow rate.

* * * * *